Feb. 8, 1966  J. B. EDGAR  3,233,279
COLLAPSIBLE AUTOMATIC FISH SCALER
Filed Nov. 10, 1964  2 Sheets-Sheet 2
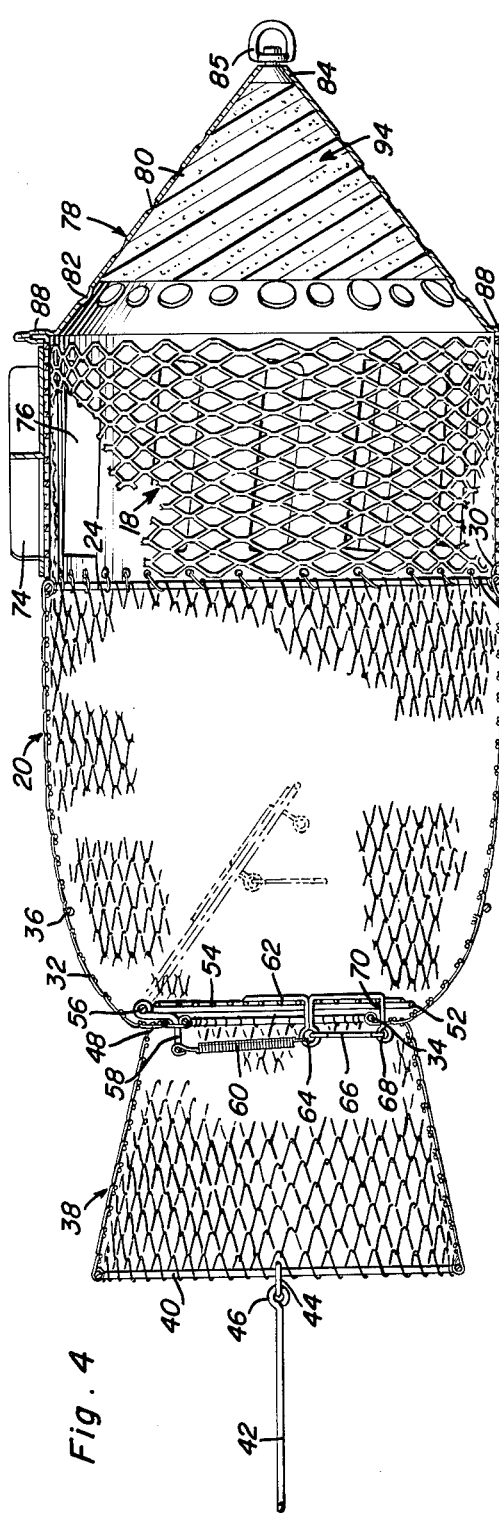
John B. Edgar
INVENTOR.

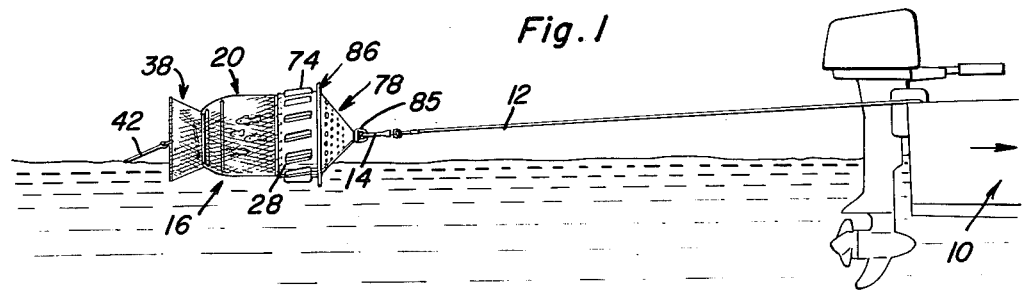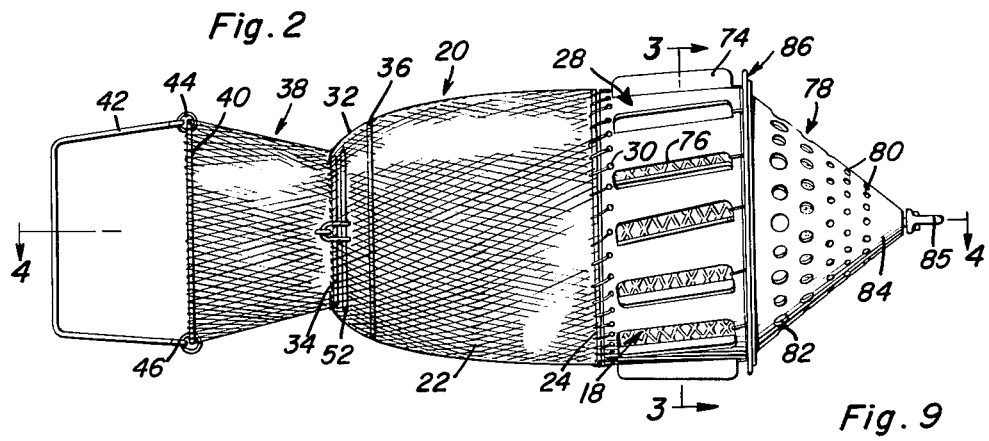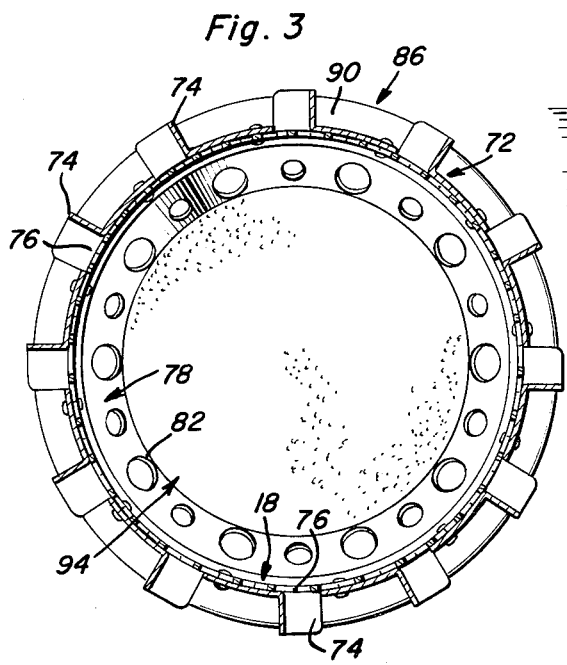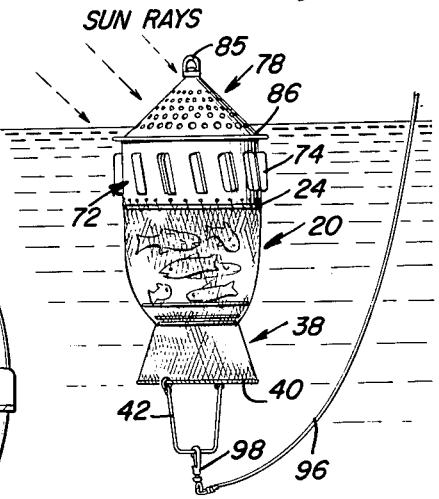
John B. Edgar
INVENTOR.

United States Patent Office 3,233,279
Patented Feb. 8, 1966

3,233,279
COLLAPSIBLE AUTOMATIC FISH SCALER
John B. Edgar, 6119 Glenwood Drive,
Baton Rouge, La.
Filed Nov. 10, 1964, Ser. No. 410,100
13 Claims. (Cl. 17—5)

This invention relates to a multipurpose device for diversified use by fishermen which is unique in that it serves as an automatic type fish scaler, a live fish box while fishing and, in addition, as a fish basket for carrying and transporting the fish, whether scaled or not.

Briefly, the invention comprises an elongated hollow body or container made of foraminous fish scaling material and provided at one end with a perforated nose cone. The apical end of the nose cone has a swivelly mounted eye for attachment thereto of a boat-pulled towline. The rear end of the cone is joined to a circular outstanding flange which functions as a wabble-type baffle. A bladed collar surrounds the body, serves as a simple impeller and imparts rotation to the container as it is towed and tumbles the fish in the container to expedite scaling. The other end of the container has a loading and unloading funnel and a hinged trap door, located at the junction of the container and funnel, respectively.

The device herein disclosed is structurally and functionally similar to but is an improvement on the combination livebox and scaling means revealed in my copending application, Serial No. 268,867 which is now Patent No. 3,178,764, dated April 20, 1965.

This invention is novel in that self-contained power is not required for scaling. It is conveniently attached to a towline and trolled behind a moving boat. This procedure is resorted to during the angler's return trip to the takeoff or landing or while the boat is employed for a short boat ride, for example, between fishing spots. It serves to automatically scale the entire catch, cleans itself and overcomes the need for messy, slimy hand scaling.

The nose cone pilots and directs the device over floating logs, similar obstructions and debris. The flange-type baffle causes the device to ascend to and ride the water's surface, similar to a water ski. It also causes it to rock and wobble and results in pitching the fish forward and washing them across the rigid scaling screen at the rearward end of the nose cone.

A significant improvement resides in the provision of a perforated sheet metal or equivalent nose cone having a rearward flange joined to a forward marginal edge of a wide-band collar, the latter encircling a coarse rigid annular scaling screen.

The collar and cone provide a receiver for a collapsible fish container and also a collapsible loading and unloading funnel carried thereby. Accordingly, the funnel and container can be collapsed and compactly and conveniently telescoped into the receiver when not in use.

Another improvement resides in the construction of the collar in that the band portion has impeller blades struck out and providing circulating slots. These slots and cooperating blades are circumferentially spaced for effective scaler rotating and fish tumbling and turning results.

The perforations in the nose cone are advantageous in that they admit water jets under pressure which aid in the scaling and self-cleaning procedure. Also, when the cone is provided with an internal float (which is optionally used when serving as a live fish box) these perforations or holes provide vents when bodily lifting the live box out of the water.

A further improvement is predicated on providing a chain link funnel which is provided at its inlet or mouth portion with a shape-imparting, retaining and rigidifying ring, the latter serving to facilitate attachment of a pivoted bail or handle to the funnel.

Then, too, novelty is predicated on the use of a pouch-like collapsible container or trap which has a novel trap door at the rearward end and reinforcing rings at forward and rearward ends to maintain the desired shape and wherein the forward ring assists in lacing or otherwise joining the forward end of the container to the rearward edge portion of the band-like collar.

Finally, by using a float contained nose cone the latter serves as a sun shade for the contained fish, that is, when the device is hung over the side of a boat (or is pulled along by a wading angler) and accordingly employed as a live fish box.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation showing the improved collapsible automatic fish scaler, the manner in which it is constructed, and the manner in which it is connected with a towline and towed for scaling behind a moving boat;

FIGURE 2 is a view in side elevation of the device on a scale larger than that shown in FIG. 1;

FIGURE 3 is a cross-section on a larger scale taken on the plane of the section line 3—3 of FIGURE 2;

FIGURE 4 is an enlarged central longitudinal sectional view with parts taken in section and elevation appearing on the section line 4—4 of FIGURE 2;

FIGURE 5 is a fragmentary view of the rear end portion of the loading and unloading funnel at the trailing end of the device;

FIGURE 6 is a fragmentary perspective view showing the manner in which an end portion of the coarse scaling screen is connected with component portions of the wabble-type flange;

FIGURE 7 is a view in perspective of the closure means at the juncture of the funnel and coacting rear end portions of the pouch-like portion of the overall container;

FIGURE 8 is a view in perspective showing the manner in which the collapsible components are collapsed and telescoped into the nose cone and bladed collar; and FIGURE 9 is a view on a smaller scale showing the manner in which the device is used as a floating live fish box.

With reference first to FIG. 1 the numeral 10 designates a boat of suitable construction provided with a towline 12 having a snap fastener 14 at its rear end separably connectible with the improved multipurpose fishing device denoted generally by the numeral 16.

The essential component parts of the over-all multipurpose scaler are shown in FIG. 4 wherein it will be noted that the container comprises two component parts; namely, a forwardly disposed rigid annular screen 18 which may be made of wire, hardware cloth, perforated steel, expanded metal, suitable plastic material, heavy nylon or a combination of such materials. This part constitutes the scaler proper. Auxiliary part 20 also removes scales, is of elongated pouch-like form and is made of collapsible chain links denoted at 22 and of the construction detailed in FIG. 5. The forward end is provided with a reinforcing ring 24 which is adjacent to a rear edge portion 26 of a rigid ring-like member 28 which constitutes an impeller. The ring 24 is connected by suitable wire connectors or links 30 to the edge portion 26 in the manner designated in FIG. 4. The rearward end portion 32 of the collapsible pouch 20 is curved inwardly and the terminal links are suitably connected to a ring 34 which constitutes an entrance or mouth for loading and unloading purposes. There is also a third or intermediate ring at 36 which is suitably attached and which rigidifies and imparts the desired shape to the rearward half-portion of the pouch. The truncated conical trailing end member 38 is also made of collapsible chain links as detailed in FIG. 5 and the links at the terminal or rear are connected suitably with an endless reinforcing ring 40 to which a handling bail 42 is pivotally connected as as 44 and 46, respectively. This funnel facilitates loading and unloading the main container. The forward links of the funnel, denoted generally at 48 are appropriately connected with coacting terminal links of the convex end portion 32 as shown in FIG. 4. The trap door or closure, which is located at the junctural point, is denoted as an entity by the numeral 50 (FIG. 7) and comprises a reinforcing ring 52 carrying suitably fabricated hardware cloth, perforated nylon or the like denoted at 54. One edge portion is connected at 56 (FIG. 4) to an L-shaped adapter or bracket 58 which in turn serves to accommodatingly connect one end portion of a normally tensioned coil spring 60. The spring and hinge means serves to keep the trap door normally closed, that is, in a position which spans the open mouth between the pouch 20 and funnel 38. It is desirable to employ fastening means by way of which the cover or trap door can be positively secured in closed position and this is accomplished by using a rod member 62 (FIG. 7) which is attached to the screen 54, has an eye 64 intermediate its ends to which a screen door type hook or latch 66 is hingedly connected. The hook of the latch is connectible with a keeper eye 68 formed at one end of the rod 62 and joined laterally thereto by an appropriate bend or bent portion 70. When the parts just described are assembled to cooperate in the manner shown in FIG. 4 it will be evident that the spring closed trap door while normally closed by action of the spring can also be positively latched by connecting the hook of the latch 66 with the keeper 68.

The scaling screen 18 and pouch 20 provide the container proper, the funnel 38 facilitates loading and unloading and carries the handle or bail 42. As shown in FIG. 4 these component parts 20 and 38 can be collapsed, that is compactly and conveniently telescoped to fit within the confines of the rigid screen 18 and the encompassing ring-like band or collar 28. Collar 28 snugly embraces the exterior of the scaling screen 18 and is unique in that it is provided at circumferentially spaced points with oblique angled outstanding impeller blades 74. These blades are struck out from the sheet metal from which the collar is made and provide circumferentially spaced slots or openings 76.

The closure means at the leading or forward end of the device comprises a rigid sheet metal or an equivalent sheet material nose cone 78 which has a plurality of perforations or orifices 80 formed therein. The rearwardmost row of openings is denoted at 82. The truncated forward or apical end 84 is provided with a swivelly mounted eye 85 which serves to accommodate the snap fastener 14 on the aforementioned towline 12. It will be noted that the rearward or base end of the cone is formed with an endless outstanding or radial flange 86 which constitutes a wabble-type baffle. The bent portions 88 and 90 of the flange provide a channel between which terminally bent portions of the forward end of the screen 18 are fitted and clenched in place. These end portions or terminals are denoted at 92 in FIG. 6.

It will be evident that the rigidifying ring 24 (FIG. 4) not only maintains the shape of the forward end of the pouch 20 but facilitates lacing the same to the edge of the rigid bladed impeller or collar. The rings 36 and 34 maintain the gradually restricted or rounded truncated shape at the rear end of the pouch.

The baffle-type flange 86 causes the device to rock and pitch in an indeterminate manner and consequently the fish are pitched forward and the water and momentum gained wash the fish across the component parts of the scaling screen in an evident manner. The blades on the collar function to impart rotation to the device with the result that the fish are tumbled about and scaled on both sides.

When the device is used as a livebox in the manner shown in FIG. 9 it is caused to float in the position shown by way of a buoyant insert or float 94 which is either permanently or removably mounted within the receptacle portion of the nose cone. It should be noted that the float, while it covers the forward rows of holes 80, does not cover the rearward row 82. It will also be noted in FIG. 9 that an anchoring line 96 is provided and equipped with a snap fastener 98 which is separably connectible with the bail or handle, this arrangement being used when the device is tied to a boat or alternatively when a fisherman is wading while fishing.

The cone and collar are made of perforated sheet material so as to admit water as a livebox to provide a rough surface inside the box for scaling, and provide a planing surface to bring the device to the surface and hold it there for scaling action when pulled by the motor boat. The pulling end is cone-shaped so that it will always be facing up, no matter what position it is in, which causes it to rise to the surface instead of digging in when pulled.

The blades placed at an angle cause the scaler to rotate or rock back and forth and sideways. The position of the box riding on top of the wake of the motor boat (outboard or inboard) determines whether or not it will have a rotating motion or a rocking or swinging action horizontally.

A baffle extending the circumference of the cone causes the rear of the box to buck up and down (vertically) continually throwing the fish forward in the box and they are washed against the screen sides to the rear of the box by the surface water and momentum.

The screen 18 which is the scaling surface, is made of screen composition which may be of various shapes, sizes and materials as long as the mesh is porous enough for the edges to catch the scales and also let the removed scales escape through it. The edges must not be sharp enough to cut the skin or flesh of the fish after the scales are removed. The mesh of the screen must be rough enough and exposed enough to catch the hard scales but must be smooth enough for the flexible skin of the fish to slide over it. The openings of the mesh must be much smaller than the fish so that the skin and flesh will be sliding over a number of openings at a time. The screen must be strong enough to withstand frequent usage.

The action of the box also causes the fish to move against each other thereby removing some of the scales. The livebox and scaler may be made in various sizes to accommodate the number and size of the fish to be scaled at one time. When different species of fish are scaled at the same time the scaler should be pulled in and the soft-scaled fish removed as they will be completely scaled before the hard-scaled fish have been completely scaled. This provides additional surface for scaling action for the tougher-scaled fish. Scaled fish may be removed and placed in an ice box and the live box immediately used again for an additional catch.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic fish scaler comprising an elongated hollow body made of foraminous material fabricated to scale live fish when they contact the component portions of the foraminous material, first closure means embodied in the trailing end of said body and adapted to permit the fisherman to manually load and trap live fish in the chamber of said body for automatic self-scaling and also adapted to permit the scaled live fish to be unloaded, second closure means embodied in and oriented with the leading end of said body and provided at its forward end with means for attachment of a boat-pulled towline, and a slotted collar surrounding and secured to said body, said collar being provided with circumferentially spaced radially projecting impeller blades which impart rotation to said body while it is being towed.

2. The structure according to claim 1, and wherein said first closure means comprises a hingedly mounted spring-closed trap door having manually regulable fastening means which is adapted to positively secure the door against accidental opening when necessary or desired.

3. The structure defined in claim 1, and wherein said trailing end is provided rearwardly of said first closure means with a loading funnel aligned and registering with said first closure means.

4. The structure according to claim 3, and wherein the rearward intake end of said funnel is provided with a pivoted handling bail.

5. The structure according to claim 4, and wherein said funnel is fabricated from flexibly interconnected chain links, is extensible and contractible lengthwise and is accordingly collapsible to assume compact form.

6. The structure according to claim 1, and wherein said second closure means comprises a wholly perforated forwardly extending rigid nose cone axially aligned with said leading end, the rearward end of said nose cone having an integral outstanding circular flange constituting a container wobbling baffle, the latter coacting with said nose cone and causing the overall scaler to plot itself to and remain on the water's surface when the scaler is being towed behind a moving boat.

7. The structure according to claim 6, and wherein said collar comprises a wide ring-like band having portions struck out to define the impeller blades, the latter and the accompanying proximal slots being circumferentially spaced around the circumference of the collar.

8. The structure according to claim 7, and wherein the forward marginal edge of said collar is joined to said flange, the outside diameter of said collar being less than the outside diameter of said flange.

9. The structure according to claim 7, and wherein the forward marginal edge of said collar is joined to said flange, the outside diameter of said collar being less than the outside diameter of said flange, that portion of the body which is immediately surrounded by said collar being rigid and the median and rearward portions of said body being fabricated from flexibly interconnected chain links and being collapsible into relatively small form and adapted, when not in use, to be collapsed and compactly telescoped and pocketed within the encompassing confines of the nose cone and collar.

10. A multipurpose fishing device comprising a hollow elongated body made of foraminous material and providing a live fish container and having first and second closure means at its respective ends, the first closure means being located at one end and embodying a manually openable and closable cover permitting live fish to be inserted into and subsequently emptied from said container by way of said one end, handle means attached to said one end, said second closure means comprising a perforated nose cone, the forward apical end of said cone being provided with a swivelly attached line attaching eye, the rearward end of said nose cone being joined to an outstanding flange which in turn encircles and is joined to the other end of said body and projects radially beyond the outer surface of the body and constitutes a wabble-type baffle and cooperates with the nose cone in causing the container, when used for scaling, to rise to and remain on the water's surface when the container is towed from a boat by a towline attached to said swivelly attached eye, and bladed impeller means surrounding said body between the respective end portions of said body.

11. The structure according to claim 10, and wherein the major portion of said body is telescopingly collapsible, said one end of said body being provided with a collapsible funnel embodying an intake mouth portion provided with a reinforcing ring, and a bail pivotally joined to said ring.

12. The structure according to claim 11, and wherein the major forward and body portions of said cone are filled with a buoyant material constituting a float and facilitating the use of the device as an over-the-boat-side livebox for fish.

13. A livebox for fish comprising a foraminous hollow body having a perforated nose cone at one end provided with an encircling flange, said nose cone having buoyant filler means encased therein, a bladed collar encircling and secured to a limited portion of said one end, the major part of said body beyond the locale of said collar being collapsible, the other end of said body having a telescoping collapsible funnel carrying a pivoted wire bail, and a hinged spring-closed trap door operatively mounted at the juncture of said body and funnel, respectively.

No references cited.

SAMUEL KOREN, *Primary Examiner.*

LUCIE H. LAUDENSLAGER, *Examiner.*